United States Patent
Finley et al.

(10) Patent No.: US 8,577,638 B1
(45) Date of Patent: *Nov. 5, 2013

(54) IMAGING SYSTEM AND ASSOCIATED METHODS

(76) Inventors: Michael Cain Finley, Roswell, GA (US); Michael J Dudgeon, Suwanee, GA (US)

(*) Notice: Subject to any disclaimer, the term of this patent is extended or adjusted under 35 U.S.C. 154(b) by 1234 days.

This patent is subject to a terminal disclaimer.

(21) Appl. No.: 11/762,490

(22) Filed: Jun. 13, 2007

(51) Int. Cl.
*G01C 19/00* (2013.01)
*G06K 9/32* (2006.01)

(52) U.S. Cl.
USPC .......................... 702/101; 382/295

(58) Field of Classification Search
USPC ............ 702/104, 85, 159, 94–95, 127, 702/150–153, 155–157, 179, 182–183, 702/189–190; 356/124, 127, 138, 614–616, 356/620, 622, 625, 627–628; 359/554, 831, 359/894; 382/254, 276, 282, 286, 291, 293, 382/295, 302, 311–312, 317
See application file for complete search history.

(56) References Cited

PUBLICATIONS

Nakano et al., Camera Calibration with Presise Extraction of Feature Points Using Projective Transformation, 2002, International Conference on Robotics & Automation, pp. 2532-2538.*
Heikkila, Janne, Accurate Camera Calibration and Feature Based 3-D Reconstruction from Monocular Image Sequences, Oct. 10, 1997, Infotech Oulu and Department of Electrical Engineering, University of Oulu, Finland, 129 pp.*
Becker, "Semiautomatic Camera Lens Calibration from Partially known structure", http://alumni.media.mit.edu/~sbeck/results/Distortion/distortion.html, MIT Media Lab, 1994.
Zhang, "A Flexible New Technique for Camera Calibration", http://research.microsoft.com/~zhang/calib/, Microsoft Research, 2000.
Murphy, "Lens calibration with Panorama Tools", http://www.culture.com.au/virtual/tutorials/calib.htm, The Culture Domain, 1999.

* cited by examiner

*Primary Examiner* — Toan Le
(74) *Attorney, Agent, or Firm* — Douglas J Visnius

(57) ABSTRACT

An imaging system may include a housing and an aperture in the housing. The imaging system may further include sensors adjacent the aperture. The sensors may be responsive to an image signal received through the aperture. The imaging system may further include a controller in communication with storage and the sensors. The storage may include calibration data. In addition, the controller may transform the calibration data into a rectified image through use of the image signal.

20 Claims, 6 Drawing Sheets

```
 0  1  2
0 00 01 02
1 10 11 12
2 20 21 22
```
FIG. 3
Real-world calibration object
Resulting image
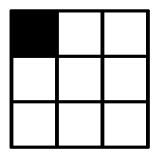
FIG. 4
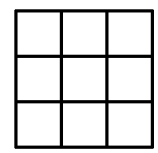
Cal00
FIG. 5
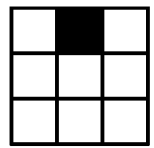
FIG. 6
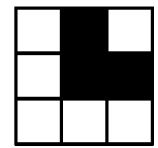
Cal01
FIG. 7
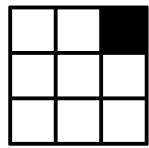
FIG. 8
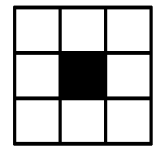
Cal02
FIG. 9
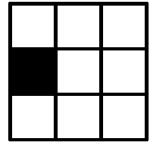
FIG. 10
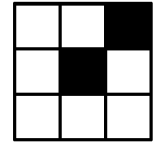
Cal10
FIG. 11
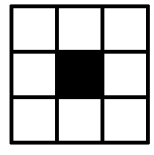
FIG. 12
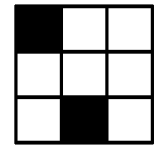
Cal11
FIG. 13

Real-world calibration object
Resulting image
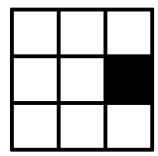
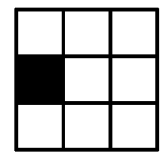 Cal12
FIG. 14
FIG. 15
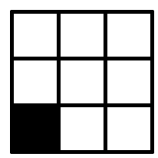
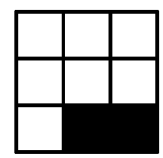 Cal20
FIG. 16
FIG. 17
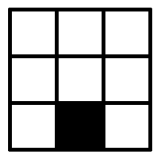
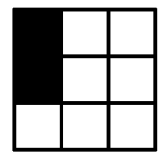 Cal21
FIG. 18
FIG. 19
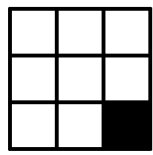
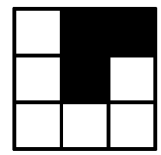 Cal22
FIG. 20
FIG. 21
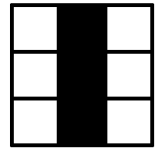
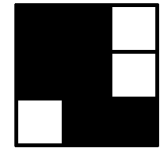 Ukn
FIG. 22
FIG. 23
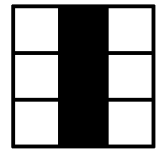
FIG. 28

| Ukn Pixel | Calibration images | | | | | | | | |
| --- | --- | --- | --- | --- | --- | --- | --- | --- | --- |
| | 00 | 01 | 02 | 10 | 11 | 12 | 20 | 21 | 22 |
| 00 | | | | | .5 | | | .5 | |
| 01 | | .5 | | | | | | | .5 |
| 02 | | | | | X | | | | X |
| 10 | | | | | | .5 | | .5 | |
| 11 | | .25 | .25 | .25 | | | | | .25 |
| 12 | | | | | | | | | |
| 20 | | | | | | | | | |
| 21 | | | | | .5 | | | .5 | |
| 22 | | .5 | | | | | | .5 | |

FIG. 24

| Ukn Pixel | Calibration images | | | | | | | | |
| --- | --- | --- | --- | --- | --- | --- | --- | --- | --- |
| | 00 | 01 | 02 | 10 | 11 | 12 | 20 | 21 | 22 |
| 00 | | | | | .5 | | | .5 | |
| 01 | | 1 | | | | | | | |
| 02 | | | | | X | | | | X |
| 10 | | | | | | .5 | | .5 | |
| 11 | | 0.5 | 0.5 | | | | | | |
| 12 | | | | | | | | | |
| 20 | | | | | | | | | |
| 21 | | | | | .5 | | | .5 | |
| 22 | | .5 | | | | | | .5 | |

FIG. 25

| Ukn Pixel | Calibration images | | | | | | | | |
|---|---|---|---|---|---|---|---|---|---|
| | 00 | 01 | 02 | 10 | 11 | 12 | 20 | 21 | 22 |
| 00 | | | | | .5 | | | .5 | |
| 01 | | 1 | | | | | | | |
| 02 | | | | X | | | | | X |
| 10 | | | | | | .5 | | .5 | |
| 11 | | 1 | | | | | | | |
| 12 | | | | | | | | | |
| 20 | | | | | | | | | |
| 21 | | | | | .5 | | .5 | | |
| 22 | | 1 | | | | | | | |

FIG. 26

| Ukn Pixel | Calibration images | | | | | | | | |
|---|---|---|---|---|---|---|---|---|---|
| | 00 | 01 | 02 | 10 | 11 | 12 | 20 | 21 | 22 |
| 00 | | | | | .5 | | | .5 | |
| 01 | | 1 | | | | | | | |
| 02 | | | | X | | | | | X |
| 10 | | | | | | .5 | | .5 | |
| 11 | | 1 | | | | | | | |
| 12 | | | | | | | | | |
| 20 | | | | | | | | | |
| 21 | | | | | .5 | | .5 | | |
| 22 | | 1 | | | | | | | |
| Probability | | 3 | | | 1 | .5 | | .5 | 1 |

FIG. 27

IMAGING SYSTEM AND ASSOCIATED METHODS

FIELD OF THE INVENTION

The invention relates to the field of imaging, and, more particularly, to imaging systems and related methods.

BACKGROUND OF THE INVENTION

There are numerous imaging systems in which mathematically derived corrections may be applied to an image. For example, dpreview.com/learn/?/Glossary/Optical/Barrel_Distortion_01.htm and alumni.media.mit.edu/~sbeck/results/Distortion/distortion.html both disclose a system in which an algorithm may be used to rectify a distorted image.

Another technique for correcting a distorted image is to use an image generated by an imaging system as calibration data. The calibration data is then used to compensate for distortions in the image caused by the imaging system. For instance, research.microsoft.com/~zhang/calib/ and culture.com.au/virtual/tutorials/calib.htm are two such systems where the images may serve as calibration data for a given imaging system.

Further, there is additional work where the imaging system sorts out dynamic obstacles such as darpa.mil/sto/solicitations/srvs/060313_srvs_industry_day_vorontsov_ricklin.ppt#310,1,Slide 1. This imaging system may use statistical analysis in the time domain to rectify a distorted image.

SUMMARY OF THE INVENTION

Advantages in accordance with the various embodiments of the invention are provided by an imaging system that may comprise a housing including an aperture. The imaging system may further comprise sensors adjacent the aperture, and the sensors may be responsive to an image signal received through the aperture. The imaging system may further include a controller in communication with the sensors, and storage in communication with the controller. The storage may include calibration data. In addition, the controller may transform the calibration data into a rectified image through use of the image signal. Accordingly, an imaging system may be provided that may be used in uncontrolled conditions and which may resolve features of the environment that would not otherwise be coherent or detectable.

The imaging system may further comprise a lens carried by the housing with the aperture between the lens and the sensors. The imaging system may further include an interface in communication with the controller to render the rectified image.

The controller may generate the calibration data by positioning a known optical influence at a plurality of positions in a field of effect. The controller may determine a value for the known optical influence at each position.

The controller may generate the rectified image in three dimensions when the sensors provide the image signal as two-dimensional. The controller may generate the calibration data by using the image signal in a fitting algorithm to guide selection of the calibration data. The fitting algorithm may be statistically based. Further, the controller may generate the rectified image as substantially comprising calibration data.

Another aspect of the invention is a method for rectifying an image. The method may include generating calibration data for an imaging system, and receiving an image signal with the imaging system. The method may further include transforming the calibration data into a rectified image through use of the image signal.

BRIEF DESCRIPTION OF THE DRAWINGS

FIG. 3 illustrates the pixel nomenclature that will be used for a prophetic example in accordance with the invention.

FIG. 4-23 illustrates the various steps in the calibration process used in a prophetic example in accordance with the invention.

FIG. 24-27 illustrates the various steps in the rectification process used in the prophetic example in accordance with the invention.

FIG. 28 illustrates the results of the prophetic example in accordance with the invention.

DETAILED DESCRIPTION OF THE PREFERRED EMBODIMENTS

Figure 1:
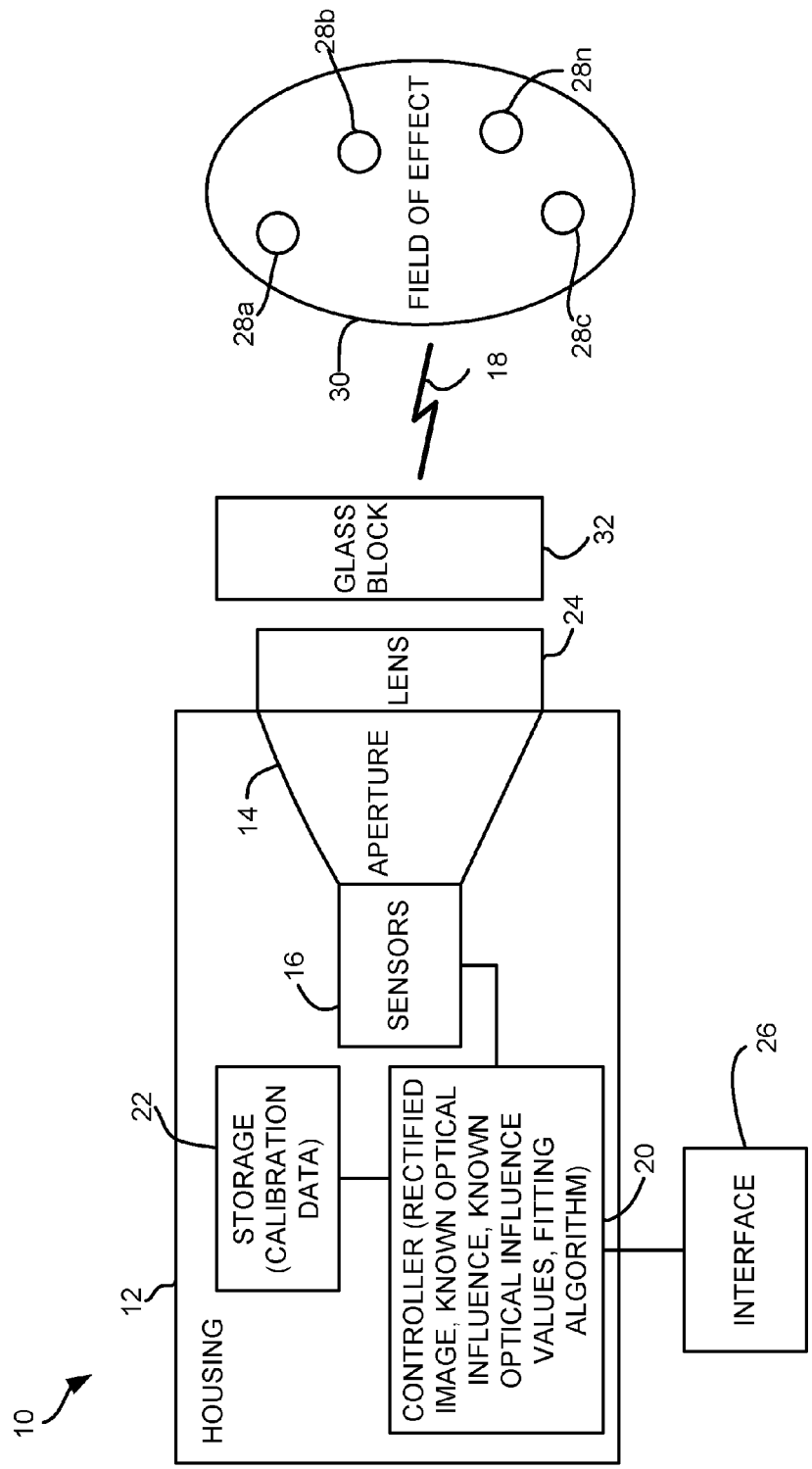
FIG. 1 is a schematic block diagram of an imaging system in accordance with the invention.

The invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

As will be appreciated by one skilled in the art, the invention may be embodied as a method, system, or computer program product. Furthermore, the invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, or a magnetic storage device.

Computer program code for carrying out operations of the invention may be written in an object oriented programming language such as Java, Smalltalk, C++ or the like. However, the computer program code for carrying out operations of the invention may also be written in conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring initially to FIG. 1, a system 10 for imaging is initially described. The imaging system 10 may be a camera, photocopier, scanner, or the like. The system 10 includes a housing 12 with an aperture 14, for example. The imaging system 10 further comprises sensors 16 adjacent the aperture 14, and the sensors may be responsive to an image signal 18 received through the aperture. For instance the sensors 16 are transducers as will be appreciated by those of skill in the art.

The imaging system 10 further includes a controller 20 in communication with the sensors 16. The controller 20 is a processor, microprocessor, application specific integrated circuit, logic circuitry, software, combination of hardware and software or the like for processing data in a computer or other programmable data processing apparatus.

In one embodiment, the controller 20 is also in communication with storage 22. In other embodiments, the storage 22 may be embedded in the controller 20. The storage 22 includes calibration data. The controller 20 transforms the calibration data into a rectified image through use of the image signal 18. As a result, an imaging system 10 is provided that may be used in uncontrolled conditions and which may resolve features of the environment that would not otherwise be coherent or detectable.

In one embodiment, the imaging system 10 further comprises a lens 24 carried by the housing 12 with the aperture 14 between the lens and the sensors 16 as will be appreciated by those of skill in the art. In another embodiment, the imaging system 10 further includes an interface 26 in communication with the controller 20 to render a rectified image. The interface 26 may be external of the housing 12 or carried by the housing. For example, the interface 26 is an input/output screen as will be appreciated by those of skill in the art.

In one embodiment, the controller 20 generates the calibration data by positioning a known optical influence at a plurality of positions 28a-28n in a field of effect 30. The controller 20 determines a value for the known optical influence at each position 28a-28n.

The controller 20 generates the rectified image in three dimensions when the sensors 16 provide the image signal 18 as two-dimensional. The controller 20 generates the calibration data by using the image signal 18 in a fitting algorithm to guide selection of the calibration data.

The fitting algorithm is statistically based, for example. In other words, the controller 20 may derive a most likely set of real world constituents based on associating a set of calibration images with the distorted image and forming a final image based on a superimposition of the calibration sources. Further, the controller 20 generates the rectified image as substantially comprising calibration data, for instance.

Figure 2:
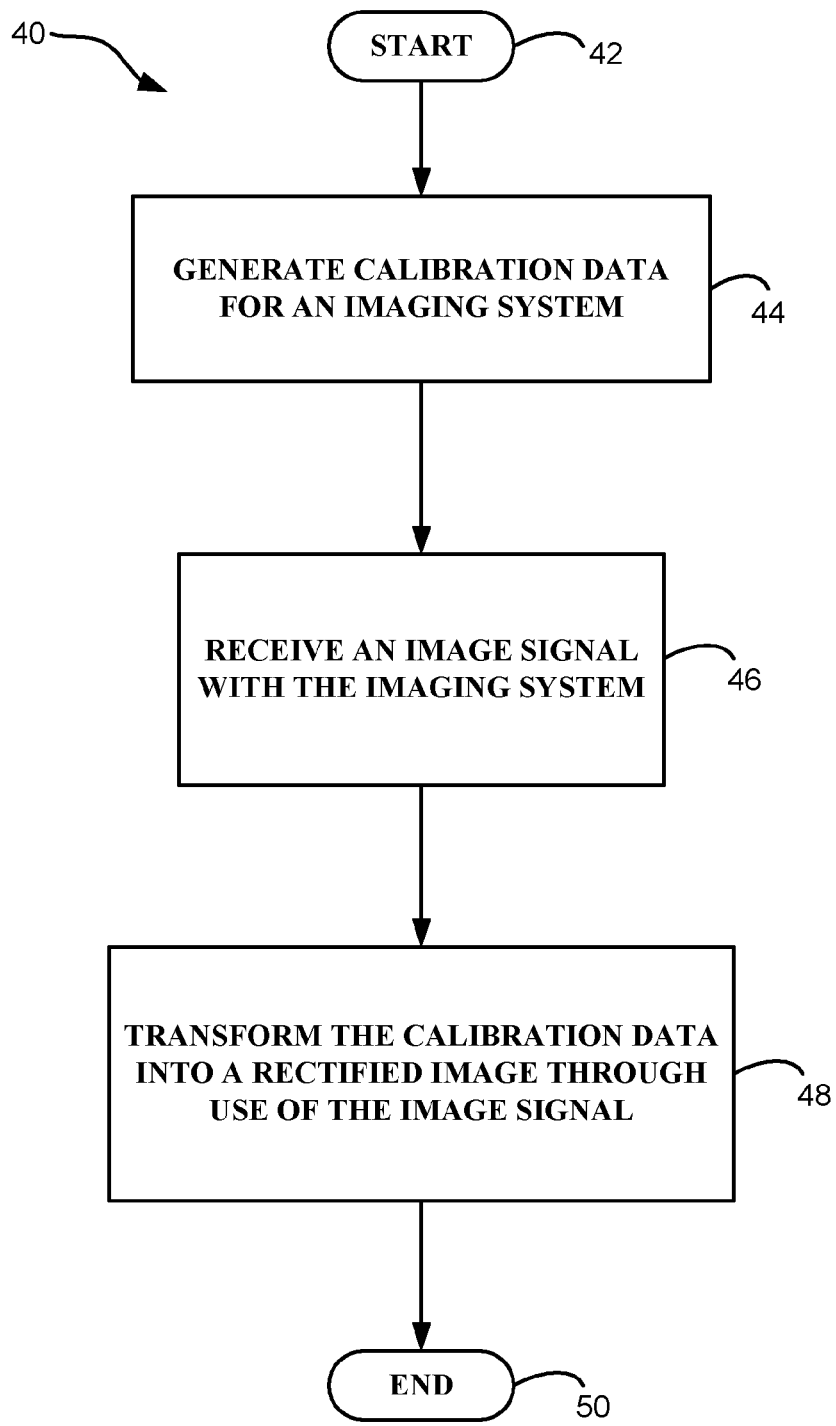
FIG. 2 is a flowchart illustrating method aspects according to the invention.

Another aspect of the invention is directed to a method for rectifying an image, which is now described with reference to flowchart 40 of FIG. 2. The method begins at Block 42 and may include generating calibration data for an imaging system 10 at Block 44. The method may also include receiving an image signal 18 with the imaging system 10 at Block 46. The method may further include transforming the calibration data into a rectified image through use of the image signal 18. The method may end at Block 50.

A prophetic example of how the imaging system 10 may work is now described. An imaging system 10 may be calibrated by a process of modifying its environment under controlled conditions and recording the imaging system's 10 output after each controlled modification. Subsequently, the imaging system 10 can be used in uncontrolled conditions wherein the calibration data and algorithms can resolve features of the environment that would not otherwise be coherent or detectable.

Examples include resolving a coherent image through a rough construction glass block 32 which distorts and contorts the image signal 18; resolving a coherent image from an imaging system 10 that has a broken or damaged lens or mirror; resolving a coherent image from an irregular but reflective floor tile reflection such as might be necessary in a security camera configuration.

The imaging system 10 may be calibrated by "walking" a small object (calibration target) through a number of positions in the field of view, keeping all other conditions such as objects and lighting sources unchanged during this process. The field of view for calibration should be expanded to include areas where light does not necessarily go directly into the imaging system 10 but from which reflected light might flow. This is called the field of effect 30 as a new term in the invention which contrasts with the art's "field of view" because it is the entire area that has some effect on the resulting image from the imaging system 10. The field of effect 30 is anywhere that changes even one pixel of the image captured by the imaging system 10 (off reflecting surfaces, at various levels of coherence, color and reflectivity), for example.

By observing the impact of a small object at every point in the field of effect 30 under controlled conditions, subsequent unidentified targets can be rendered coherent in a transformation. A pan/tilt assembly (not shown) directed by the controller 20 that receives input from the imaging system 10 could in effect move a laser point through a well-defined number of steps in the solid angle of the imaging system, in effect causing changes to the environment which would be detectable by the imaging system. Given knowledge of the position of the laser (angular orientation relative to the line of sight of the imaging system 10) and controlled conditions during some calibration phase, this process could conceivably automate the process of calibrating the assembly, enabling it to be done quite rapidly.

Let S( ) represent an image signal 18, in this case the image signal from an imaging system 10. S( ) has dimensions of time (images are captured sequentially) as well as color (red, green and blue), position (horizontal and vertical pixel position in the image) and potentially angular dimensions indicating the orientation of the imaging system 10 at the time of acquisition of the image signal 18 or even n, where n is the imaging system number in question. Therefore S(t,n,a,b,c,x,y)=intensity where t is time, n is the imaging system number, a is a radial angle, b is a polar angle, c is the color, and x,y indicates a position on the sensor's 16 pixel grid.

The intensity signal, then, has a definite value for each color for each pixel for each time an image signal 18 is captured. The time, imaging system number and angular components can be treated as secondary dimensions so we simplify by stating:

S(c,x,y)=intensity, which is to say that at any given time, there is a matrix for each primary color which represents the signal from the imaging system 10 at that time.

If we control the circumstances so that nothing is changing with time, then for any given imaging system 10 we can introduce a calibration target object at a position X,Y,Z in space relative to the imaging system and thus capture an image signal 18, $C_{X,Y,Z}$=S, where the entire set of calibration information C is a set of image signals 18 taken with the calibration target placed at every position in the field of effect 30. In order to constrain the set C to a discrete rather than infinite set of data, space may be quantized into some minimal element size as tolerable by the hardware and desired quality of image (resolution).

The object in the field of effect 30 can be a point of laser light created by a tilt/pan mechanism that is associated with the imaging system 10. In this mode, a self-calibrating mechanism "walks" a laser point through the solid angle of the imaging system's 10 aperture 14, reviewing the impact on the imaging system's image that is caused by the reflections and refractions of the laser light. This mode of calibration may not yield ideal results given that it cannot, for example, simulate light diffusion effects. Similarly, the laser light point cannot be projected behind opaque objects even if there are interesting features behind those objects which will therefore be unseen. However, as a practical implementation, it could be powerful in its use.

Clearly if the calibration target is a real object, it must have orientation dimensions as well—these are assumed to be additional dimensions on the calibration data and not shown. Now, assume some unknown object is placed in the field of effect 30 and an image signal E=S(t) is captured. Since every point in three-space (within the resolution capability of the sensors and the size/positioning capability of the calibration process) has been evaluated for its impact on the signal S and stored in the calibration data C, it must be possible to create E with some additive function over the data in C. E=sum over all X,Y,Z of ($w_{X,Y,Z} * C_{X,Y,Z}$).

Given that the calibration images represent every possible object placement in the field of view (down to the relevant resolution of the calibration process and sensors 16), the signal E must be very nearly composed of some number of the calibration images. By representing the signal E as a sum of all calibration images, with a weighting function that essentially can block out the influences of calibration images that are not relevant, we reach a solvable mathematical formulation in matrix form with only one variable, the weight function w.

Determination of the weight functions w then resolves the relevance of each point X,Y,Z in the field of effect 30, thus translating the signal S into a representation of three-space which can be rendered into an image using standard trigonometric techniques for visualization, or otherwise used as input to further processing or decision-making elements. It is notable that this methodology can generate spatial information (that is, three dimensions) from 2 dimensional camera sensors that are adequately calibrated in three dimensions.

Solving for the three dimensional matrix w, then, provides a means of extracting coherent information regarding the field of effect 30 from an otherwise completely unconstrained video signal S, given only a careful calibration data set C. The problem of solving for w is a fitting task.

Fitting algorithms well known in the art can be applied successfully to the data sets. This problem has no guarantee of being solvable for any given set of images or for any given point in time unless specifically constrained. Therefore coherence can also be introduced using constraint data that is passed from frame to frame as the imaging system 10 captures image signals 18 through time.

For example, the fitting function may be unable to resolve unambiguously between two possible calibration weights, either of which could cause the uncontrolled sensor image E to match a set of real-world field of effect 30 changes. In this situation, control information known from frame to frame could provide a means of eliminating one or many of the possible solutions. This control information would be based on the laws of physics governing the field of effect 30, such as continuous motion of objects, conservation of energy, and so forth. In addition, the use of a normalization process to adjust lighting levels can be used to provide constraint and therefore useful adjustments that will assist in resolution of the image. Calibration images are adjusted so that light intensity varies within a specific range for a given color or total composite intensity. Similarly, the same normalization process is applied to captured images before the calculation of weighting functions. In this way, effects due to changes in the intensity of lighting conditions are removed from the final outcome.

A simple case of the invention is an imaging system 10 looking at a smooth mirror where the calibration process would essentially provide a map for reversing the image signals 18 of objects in a room 'behind' the imaging system. The scenario is more complex but still valid if the smooth mirror were replaced with a piece of tin-foil. In this case, the calibration process would essentially map-out the creases in the foil and create a means of 'undoing' the distortion of the scene that the imaging system 10 is seeing reflected off the foil.

In fact, it could even work better than a mirror because one small change in the room could reflect off many surfaces depending on the crease of the foil, changing many pixels in the image signal 18. Another change in the room that would appear very similar to the naked eye would affect some other slightly different combination of the pixels.

Applications range from surveillance and security to medical. In one scenario, a digital camera manufacturer could include this process embedded in their cameras, thus allowing for the use of lower quality lenses (with factory-based calibration to correct all lens flaws) while preserving substantially improved final images. In another scenario, the camera could include an internal means of re-calibrating itself each time the lens cover is closed (by including a means of testing the lens one pixel input at a time), allowing perfect images from dirty, scratched or damaged lenses.

Similarly, a manufacturing system could include a thick, occlusive shield for its user in the case of needing to observe dangerous processes. Calibrated in advance, the user could see through the shield.

A specific important embodiment of the invention is one in which the mathematics reduces to a set of linear equations with a coherent solution. In this embodiment, the following conditions are reduced from the more general problem:

the imaging system 10 is fixed, with no pan/tilt;
calibration information is taken on a plane within the field of effect 30, with no variability of depth in the field;
a single imaging system is used; and
a single color is measured (at any given time).

In this limited case, the calibration data is a set of image signals 18 that can be labeled C(XY) for each position XY of the calibration target. For each image E that needs to be resolved, we form a probability matrix consisting of as many rows as there are total pixels in the sensor 16 and as many columns as there are calibration images.

For each cell of the probability matrix, we examine the specific pixel of the source image E (where the pixel is determined by the current row of the probability matrix) and the same pixel in the calibration image corresponding to the column. Several possibilities exist:

The source image has no pixel value but the calibration image does. The physical interpretation of this is that a calibration target at this position caused an influence that cannot be found in the source therefore currently no object is found at this position. Therefore all other influences of this calibration target can be removed as well. This is accomplished by clearing all cells of the probability matrix for this column;

The source image has no pixel value and neither does the calibration image. This is of little value to the calculation;

The source image has a pixel value and the calibration image does as well. In this case, a baseline probability is assigned to the specific cell in the probability matrix; and The source image has a pixel value and the calibration image does not. In this case, there is little value to the calculation.

The resulting calibration matrix includes cells with a probability assigned. For each row, the probabilities are normalized, that is the probability value in each cell is divided by the number of cells that have a non-zero probability.

The columns of the matrix are then added. The total probability for each column corresponds to the intensity of the pixel (indicated by the column number in the probability matrix) in the resolved image. The resolved image, then, is of a size corresponding to the number of pixels in the calibration data set. Finer calibration therefore results in sharper resolution.

Another prophetic example of how the imaging system 10 may work is now described with reference to FIGS. 3-23. The example explains a possible sample qualitative process analysis for the reconstruction of a diffuse image from known real-world mapping calibration data.

FIG. 3 illustrates the pixel nomenclature that will be used. For example, pixel 11 represents the center.

The calibration process places a known object at every position in the field of effect 30, here represented by 9 possible positions with a known object of a black square. In practicality, black would be a poor color as it would not allow resolution of different color effects in each position.

In the case of the first position as illustrated in FIGS. 4 and 5, the imaging system 10 does not see the object at all (FIG. 5). This real-world point is a blind-spot, though boundary value information such as where an object was just milliseconds earlier could dictate that it should be in this position now.

The second calibration position as illustrated in FIGS. 6 and 7 has a clear path for information to arrive at the imaging system 10, but also includes two other reflected positions where the object is being delivered to three different final pixels. The third calibration position maps to a different position altogether as illustrated in FIGS. 8 and 9. The calibration continues as illustrated in FIGS. 10-21. In other embodiments, the number of calibrations positions may be greater or less than those illustrated.

After calibration, an unknown object is observed as represented in FIG. 22 and FIG. 23 represents the image signal 18 before calibration. For each pixel in the Ukn image, it may be determined which calibration images could be involved in creating the captured image signal 18.

For example, Ukn 00 is affected by the unknown real world object which can only be true if Cal11 or Cal21 images are involved. Similarly, Ukn 02 is not affected by the unknown real world object so Cal22 and Cal10 are not involved. No information is learned from the fact that two of the pixels are unaffected, ukn12 and ukn20. This is due to the nature of the distortion between the imaging system 10 and the field of effect 30.

Referring now to FIG. 24, Ukn00 qualifies two possible sources so each has a 50% chance. Ukn pixel 02 disqualifies two possible sources that would have caused it to not be clear. Ukn11 could be set by 4 possible sources, so each weighs 25%. Note that probabilities for some pixels are above 100%, indicating that the resulting image is to be 'overdriven' if we take all of the current values, and any weights on pixels that are known to be unoccupied are disqualified. For the remaining cells, the disqualified weight is re-distributed.

Referring additionally to FIG. 25, Ukn02 disqualified Cal22 so weights on Ukn01 contributors are re-adjusted. Ukn02 disqualified Cal10 and Cal22 so weights on Ukn11 contributors are re-adjusted. Now it is clear that the Ukn01 pixel must have been caused by the object as represented in the Cal01 calibration (no other possible mappings). Additionally, the remaining information in the Cal01 image may be used to further simplify the mapping matrix. Cal01 also affects Ukn11 and Ukn22 so these are resolved. Possibly other sources contribute to Ukn11 and Ukn22. These could be left as conditions to be resolved in boundary value limitations.

Referring further to FIG. 26, Ukn11 is resolved to be caused by Cal01. Ukn22 is resolved to be caused by Cal01.

Referring also to FIG. 27, the final probability map is examined and an output image is selected based on a threshold. Ukn11 is resolved to be caused by Cal01, and Ukn22 is resolved to be caused by Cal01. Therefore the original image consists of contributors from Cal01, Cal11, and Cal21. The resulting image is therefore determined to be FIG. 28, which correctly maps to the real world. The same process applies to images with individual pixel values ranging more broadly than the example values 0 and 1.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that other modifications and embodiments are intended to be included within the scope of the appended claims.

That which is claimed is:

1. An imaging system comprising:
a housing including an aperture;
sensors adjacent the aperture, said sensors responsive to an image signal received through the aperture;
a controller in communication with said sensors, said controller to generate calibration data by a calibration target walked through a field of view that includes a field of effect; and
storage in communication with said controller, said storage including the calibration data;
said controller transforming images of the calibration data into a rectified image through use of the image signal.

2. The imaging system of claim 1 further comprising a lens carried by said housing with the aperture between said lens and said sensors, imperfections in said lens compensated for by said controller based upon the calibration data.

3. The imaging system of claim 1 further comprising an interface in communication with said controller for rendering the rectified image based upon control information.

4. The imaging system of claim 1 wherein said controller generates the calibration data by positioning the calibration target at a plurality of positions in a field of effect and summing images of the calibration data.

5. The imaging system of claim 4 wherein said controller determines a weighting function to block out influences of calibration data images not relevant.

6. The imaging system of claim 1 wherein said controller generates the rectified image in three dimensions when said sensors provide the image signal as two-dimensional.

7. The imaging system of claim 1 wherein said controller generates the calibration data by using the image signal in a fitting algorithm to guide selection of the calibration data.

8. The imaging system of claim 7 wherein the fitting algorithm is statistically based.

9. The imaging system of claim 1 wherein the rectified image generated by said controller substantially comprises calibration data.

10. A method for rectifying an image, the method comprising:
generating calibration data for an imaging system by a calibration target walked through a field of view that includes a field of effect;
receiving an image signal with the imaging system; and
transforming images of the calibration data into a rectified image through use of the image signal.

11. The method of claim 10 further comprising generating the calibration data by positioning the calibration target at a plurality of positions in a field of effect and summing images of the calibration data.

12. The method of claim 10 further comprising determining a weighting function to block out influences of calibration data images not relevant.

13. The method of claim 10 further comprising generating the rectified image in three dimensions from a two-dimensional image signal.

14. The method of claim 10 further comprising generating the calibration data by using the image signal in a fitting algorithm to guide selection of the calibration data.

15. The method of claim 10 further comprising generating the rectified image as substantially including calibration data.

16. A computer program product embodied in a tangible non-transitory media comprising:
computer readable program codes coupled to the tangible non-transitory media for rectifying an image, the computer readable program codes configured to cause the program to:
generate calibration data for an imaging system by a calibration target walked through a field of view that includes a field of effect;
receive an image signal with the imaging system; and
transform images of the calibration data into a rectified image through use of the image signal.

17. The computer program product of claim 16 further comprising program code configured to: generate the calibration data by positioning the calibration target at a plurality of positions in a field of effect and sum images of the calibration data.

18. The computer program product of claim 16 further comprising program code configured to: generate the rectified image in three dimensions from a two-dimensional image signal.

19. The computer program product of claim 16 further comprising program code configured to: generate the calibration data by using the image signal in a fitting algorithm to guide selection of the calibration data.

20. The computer program product of claim 16 further comprising program code configured to: generate the rectified image as substantially including calibration data.

* * * * *